(12) United States Patent
Parietti

(10) Patent No.: US 6,488,046 B2
(45) Date of Patent: Dec. 3, 2002

(54) PRESSURE REDUCER FOR COMPRESSED GASES

(75) Inventor: Pietro Parietti, Piacenza (IT)

(73) Assignee: Poliauto di P. Parietti & C. S.n.c., Piacenza (IT)

( * ) Notice: Subject to any disclaimer, the term of this patent is extended or adjusted under 35 U.S.C. 154(b) by 0 days.

(21) Appl. No.: 09/870,275

(22) Filed: May 30, 2001

(65) Prior Publication Data

US 2001/0052365 A1 Dec. 20, 2001

(30) Foreign Application Priority Data

Jun. 2, 2000 (IT) .......................................... PC00A0023

(51) Int. Cl.$^7$ .............................................. G05D 16/08
(52) U.S. Cl. ............................ 137/505.12; 137/505.18; 137/505.22; 137/505.26; 137/505.3; 137/505.36; 137/599.09; 137/613
(58) Field of Search ...................... 137/505.12, 505.18, 137/505.22, 505.26, 505.3, 505.36, 599.09, 613

(56) References Cited

U.S. PATENT DOCUMENTS

| | | | | |
|---|---|---|---|---|
| 323,364 A | * | 7/1885 | Pfaudler ................. | 137/505.22 |
| 3,270,757 A | * | 9/1966 | Engler ................... | 137/505.22 |
| 3,753,446 A | * | 8/1973 | Hoogeboom ............. | 137/484.8 |
| 4,289,106 A | * | 9/1981 | Parietti ................... | 137/505.46 |
| 5,357,935 A | * | 10/1994 | Oxley et al. ........... | 123/198 DB |
| 6,176,256 B1 | * | 1/2001 | Nakajima et al. ...... | 137/505.11 |

* cited by examiner

*Primary Examiner*—Stephen M Hepperle
(74) *Attorney, Agent, or Firm*—Notaro & Michalos P.C.

(57) ABSTRACT

Pressure reducer for compressed gases, comprising at least one regulation stage constituted by a chamber divided by a first membrane (25) into two chambers (23, 24), one of which said chambers (24) is maintained at a reference pressure and the other (23) at a pressure which depends on the gas pressure in the outlet pipe (3), an opening, closed by a membrane (43) integral with a cap (42), located between the said chamber (24) at the reference pressure and the said gas outlet pipe (3), a gas inlet chamber (10) with an opening (11) which leads to the said outlet pipe (3) in correspondence with the said cap (42), the movements of which said cap open and close the passage (11) between the said inlet chamber (10) and the said outlet pipe (3), and means (41) integral with the said first membrane (25) which act on the said cap (42) so that it approaches and retracts from opening (11) of the said gas inlet chamber.

It is provided an additional regulation stage constituted by a chamber divided by a membrane (14) into two chambers (15, 16), one of which said chambers (16) is maintained at the reference pressure while the second such chamber (15) is maintained at the reduced gas inlet pressure into chamber (10), regulation means (19) being also provided, designed to act on the said membrane (14) to regulate the said reduced inlet pressure in the said gas inlet chamber (10), and a valve (5) designed to close a high-pressure gas inlet pipe (2, 4), which said valve (5) is integral with the said membrane (14), and means (12, 13) which place the said chamber (15) in communication with the area close to the outlet opening (11) of the said gas entry chamber (10).

10 Claims, 1 Drawing Sheet

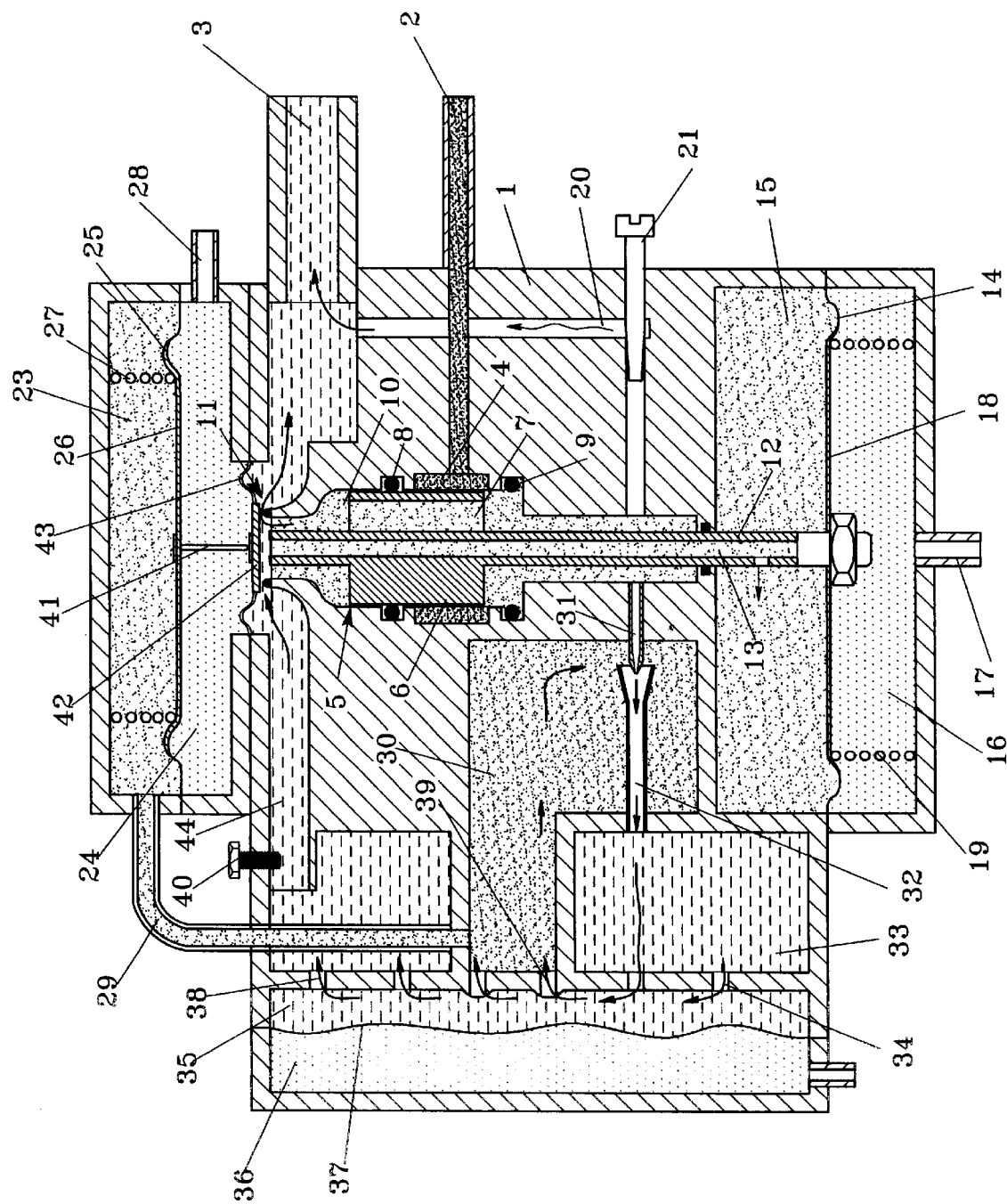

PRESSURE REDUCER FOR COMPRESSED GASES

FIELD AND BACKGROUND OF THE INVENTION

This invention relates to a pressure reducer for compressed gases which, although its use is particularly advantageous in internal combustion engine fuel supply systems, can also be used in all cases in which a gas has to be taken from a high pressure to a lower pressure, such as ambient pressure.

The reducer in accordance with the invention is very compact, and so sensitive that a small vacuum at the outlet is sufficient to ensure that the reducer supplies a large amount of gas. In the description below, specific reference will be made to the case of a pressure reducer designed for installation in the gas supply system of an internal combustion engine, but the same concepts could obviously be applied in different situations, so the invention is not limited to the specific embodiment described here but extends to all applications in which the reducer could be used.

In pressure reducers of the type used in vehicle fuel supply systems, gas which is already at a stabilised pressure is fed through a nozzle closed by a valve which regulates the gas flow in accordance with engine demand. This valve usually consists of a closing member such as a disc or the like that closes the gas outlet nozzle to the engine, and is fitted on a lever which is subject to the action of regulating devices on the opposite side. These devices usually include a membrane to which is fitted a cap with a pin that acts on the said lever from the opposite side to the one on which the closing member is located.

The membrane is subject on one side to a reference pressure which may be atmospheric pressure, and on the other to the force of a calibrating spring and a pressure which is a function of or basically corresponds to the pressure detected close to the Venturi tube of the engine intake manifold.

The spring acts on the membrane to maintain it in the valve closing position when it is in the rest condition.

During acceleration, a sufficient vacuum is created on the side of the membrane which communicates with the manifold inlet to ensure that the reference pressure on the opposite side counteracts the force exerted by the spring, and pushes the membrane to act on the lever and open the gas outlet nozzle.

To obtain the force required to counteract the spring even when the vacuum on one side of the membrane is minimal, the membrane must have a fairly large surface.

These known reducers are therefore rather bulky and therefore difficult to fit into the engine compartments of modern vehicles; moreover, their sensitivity is considered insufficient to meet current requirements.

A first solution to the problem of the insufficient sensitivity of these reducers is offered by Italian patent no. 1,099,007 (U.S. Pat. No. 4,289,106) filed by the same applicant.

That document describes a reducer which comprises two membranes: one is fitted with a cap with mechanical devices that act on a valve opening lever to counteract a spring which tends to keep the lever in the closed position, while the other, which is highly flexible, separates an inlet chamber to which part of the gas is conveyed from a chamber at the reference pressure or atmospheric pressure. Part of the gas introduced into this inlet chamber by a nozzle exits through a passage leading to the engine intake manifold, while part returns into circulation through a cavity located between the flexible membrane and a fixed wall which has an opening communicating with the area into which the gas is introduced by the said nozzle.

When suction is increased, the vacuum created sucks the free membrane against the said opening, thus closing the passage through which the gas is recirculated.

All the gas is then conveyed to the engine, so the vacuum created in the chamber by the gas exiting from the nozzle at high speed acts on the first membrane, counteracting the force of the spring and causing it to move in such a way as to control, via the lever, opening of the valve which closes the high-pressure gas inlet.

Although this solution ensures a good level of sensitivity, it still presents various drawbacks and limitations.

The fact that the gas inlet closing valve is fitted to a lever introduces friction which has an adverse effect on the sensitivity of the device, with the result that the membranes used need to be large enough to be deformed sufficiently even by minimal pressure differences.

Moreover, in these known devices the efficiency of the device declines when demand for fuel from the engine increases, and vice versa. For the reasons set out above, the need is felt in the industry for means able to reduce the pressure of compressed gases which are small enough to be easily fitted into the engine compartments of present-day vehicles, but have a very level of high sensitivity, so that the outlet gas flow can instantly be adapted to meet demand for fuel from the engine.

BRIEF SUMMARY OF THE INVENTION

This problem is now solved by the present invention, which relates to a pressure reducer for compressed gases in which pressure reduction takes place in two separate stages, and the pressure which acts on the membrane that controls opening and closing of the gas outlet valve is detected by a mobile element which moves in such a way that the pressure is always detected at the point where its value is lowest.

BRIEF DESCRIPTION OF THE DRAWING

This invention will now be described in detail, by way of example but not of limitation, with reference to the single annexed FIGURE which schematically illustrates a pressure reducer in accordance with the invention in cross-section.

DETAILED DESCRIPTION OF THE INVENTION

With reference to the FIGURE, no. 1 indicates the reducer body, which presents a high-pressure gas inlet marked 2 and an outlet 3 leading to the fuel supply system of the engine.

Inlet pipe 2 communicates with a ring-shaped chamber 4 which in turn communicates with a cylindrical chamber 10, inside which slides a valve element 5. This valve element is constituted by a cylindrical body 6 with a series of axial openings 7 which allow free passage of gas from the lower to the upper part of the chamber.

A first gasket, constituted, for example, by an O-ring 8, provides a continuous seal between the walls of the chamber and valve body 6, while a second gasket 9 at the bottom of chamber 10 provides the seal when the valve is in the lowered position in which the gas inlet passage is closed.

The upper part of chamber 10 communicates with outlet pipe 3 through a throat 11.

The body of valve 6 is integral with a stem 12 containing an axial hole 13 which places the upper part of the stem in communication with a chamber divided into two parts by a membrane 14: an upper chamber 15 into which pressurised gas is conveyed through passage 13 in stem 12, and a lower chamber 16 which is maintained at a reference pressure, for example by placing it in communication with the atmosphere through a pipe 17. A cap 18 on which a calibration spring 19 acts is fitted to membrane 14.

A pipe 20 with an idle speed screw 21 connects the lower part of chamber 10 to the gas outlet pipe, and serves to supply the engine when idling.

The interior of chamber 10 also communicates, through a nozzle 31, with a chamber 30, which is connected by a further pipe 32 to a stage which acts as servo control.

A second, regulating stage comprises two chambers 23 and 24, which are separated by a membrane 25 with corresponding cap 26 and calibration spring 27.

Chamber 24 communicates with the reference pressure through a pipe 28, while chamber 23 communicates, via a pipe 29, with chamber 30, to which leads nozzle 31, which communicates with the lower part of chamber 10.

Part of the pressurised gas is thus conveyed from chamber 10 to chamber 33, and is recirculated from there into chamber 30 through holes 34 and 39.

Nozzle 31 is located near the inlet of a pipe 32 leading to chamber 33, which communicates, through openings 34, with a second chamber divided into two areas, 35 and 36, by a flexible membrane 37.

Area 35 communicates via openings 38 with outlet pipe 3 through channel 44 with adjustment screw 40, and also communicates with chamber 30 through openings 39.

A device sensitivity adjustment screw 40 penetrates into channel 44 which connects chamber 33 to outlet pipe 3.

A stem 41 which acts on a cap 42 is fixed to cap 26 of membrane 25. A membrane 43 constitutes a flexible partition between chamber 24 and gas outlet pipe 3, at throat 11. Cap 42, located above throat 11, can move towards and retract from throat 11, following the movements of membrane 25, to open to a greater or lesser extent the passage of the gas drawn towards outlet pipe 3 from chamber 10.

Means (not illustrated) designed to compensate for the temperature drop caused by the reduction in gas pressure, such as heating fluid circulation pipes or other means of known type, could also be fitted.

The pressure reducer operates as follows.

High-pressure gas from the fuel tank enters the reducer through inlet pipe 2 which communicates with ring-shaped chamber 4, and undergoes a first pressure reduction due to the pressure drop which takes place during the passage between ring-shaped chamber 4 and the lower part of chamber 10.

This reduced pressure, which is propagated along pipe 13 of stem 12 to chamber 15, acts on cap 18 which is integral with membrane 14, and is determined by the force of calibration spring 19 which pushes cap 18.

Chamber 16 is at the reference pressure, whereas chamber 15 is at the pressure present at throat 11, due to the connection effected by axial hole 13 of stem 12, which moves axially and is integral with valve 5.

The gas conveyed to the lower part of chamber 10 can exit by three routes: the majority passes along channels 7 in valve 5, exits into the upper part of chamber 10, and exits if possible through throat 11 to chamber 3, and from there to the engine; the part of the gas required to fuel the engine at idling speed exits from the lower part of chamber 10 through channel 20, choked by idle speed screw 21, enters outlet channel 3 and is conveyed to the engine from there; another part of the gas exits from nozzle 31, passes into chamber 33 and then into chamber 35, and is conveyed through holes 38 into outlet pipe 3, and from there to the engine.

The plume of gas which exits from nozzle 31 and enters pipe 32 creates suction in chamber 30 as a result of the Venturi effect.

During idling, this suction created in chamber 30 is cancelled out by recirculation of gas through holes 34 and 39, which place the three chambers (33, 35 and 30) in communication with one another.

When gas demand from the engine begins, this engine suction is manifested in chamber 35, ie. on one of the two sides of sensitive membrane 37.

The said membrane moves towards holes 39, and progressively closes them.

As the suction in chamber 30 created by nozzle 31 is no longer wholly cancelled out by the recirculation described above, it begins to be manifested, through pipe 29, in chamber 23, forcing membrane 26 to counteract the force of spring 27 and move upwards, thus releasing cap or valve 42 which opens as a result of the pressure in chamber 10, allowing the gas to flow through throat 11 in pipe 3 and from there to the engine.

The greater the demand for gas from the engine, the greater the suction which takes place in chambers 33 and 35, the movement of sensitive membrane 37 towards holes 39, and the consequent movement of membrane 26, which releases valve 42 to a greater extent, allowing more gas to flow from chamber 10 to pipe 3 and from there to the engine. Adjustment screw 40 which chokes pipe 44 serves to regulate the sensitivity of the system. By partly closing pipe 44 it causes an increase in pressure in chambers 33 and 35 because the plume of gas which issues from nozzle 31 exits less easily from chamber 33, and sensitive membrane 37 therefore has more difficulty in approaching holes 39; the sensitivity of the system is thus reduced. Conversely, if pipe 44 is opened more, the sensitivity of the system is increased.

When the engine speed increases, the suction draws a larger amount of gas from chamber 10 through throat 11.

The consequent pressure drop in chamber 10 causes an upward movement of membrane 14, which draws with it stem 12 of body 5 of valve 6.

This movement opens the passage between ring-shaped chamber 4 and chamber 10 to a greater extent, allowing a greater flow of gas, and ensures that the end of pipe 12 is always maintained at the same distance from cap 42, so that the device constantly detects the pressure at the point at which its value is lowest.

The more gas flows to the engine, the more pressure will be required in the lower part of chamber 10 to overcome the pressure drops in channels 7 and maintain a constant pressure in chamber 15.

Thus when demand for fuel by the engine increases, the pressure increases at nozzle 31, and the efficiency of the device increases accordingly.

The solution illustrated offers considerable advantages, as described above.

When the input gas is at the maximum pressure of 30 bars (in the case of LPG) or 200 bars (in the case of methane gas, oxygen, etc.), delivery begins, with suction amounting to some 0.3 mm $H_2O$ at the outlet, which makes this device suitable for air and oxygen breathing apparatus (used by skin divers, ambulances, etc.).

Very small size (approx. 65×65×65 mm), despite the high gas delivery: for engines up to 300 hp.

Very simple to manufacture, because many of the parts used in a conventional pressure reducer are no longer required.

Levers are no longer used in the reduction stages, which eliminates play and friction and improves the opening precision and response speed of the valves which control the gas output to the engine.

There is no longer any need for a solenoid valve inside the reducer with all the connected parts (solenoid with electric wiring and connectors, needle with seal disc, needle holder with O-ring, etc.), because in view of the small volume of the chamber between the seating of the first stage and the seating of the second stage, a solenoid valve is not needed to cut off the gas outlet from this chamber when the engine is switched off, as even if the chamber is completely emptied, the engine will not flood when next started up.

All the membranes can be made from the same thin (0.15–0.2 mm) rubberised fabric, which is more sensitive and much cheaper.

The three main membranes (first-stage membrane, second-stage membrane and sensitive membrane) have the same outer diameter (60 mm).

The seating of the second stage is no longer metal+rubber disc but consists of an O-ring integral with the seating on which metal cap 42 rests; cap 42 can therefore move sideways together with the membrane without jeopardising its seal.

Mobile valve 5 of the first stage contains a tube 12 which detects the pressure reference of the first-stage membrane directly at the second-stage valve. This tube moves together with the first-stage valve; in other words, as the said valve opens, the tube gradually detects the pressure closer and closer to the outlet, and reports the information to the first-stage pressure-regulation membrane.

The calibration pressure of the first stage is totally independent of the reducer inlet pressure, which makes the device particularly suitable to fuel engines with the gas injection system, for which a constant pressure source is required (in this case, membranes 37 and 25 with the corresponding mechanical accessories can be eliminated). Uncoupling between the second-stage membrane and the second-stage gas outlet chamber is effected with a membrane 43, thus eliminating all the friction which occurs in known solutions, and achieving complete separation. It is also possible to vary the gas outflow with minimal movements of the membrane.

Moreover, the fact that the membranes only need to perform minimal movements makes it possible to use caps which are almost as large as the membranes.

As it is no longer necessary to integrate the atomiser into the device, the reducer can be made of plastic, and therefore with very inexpensive materials which are not liable to corrosion (saline fog in the case of vehicles, seawater for nautical use, etc.)

An expert in the field could devise numerous modifications and variations, all of which should be deemed to fall within the scope of this invention.

What is claimed is:

1. Pressure reducer for compressed gases, characterized in that it comprises (i) at least one regulation stage constituted by a chamber divided by a first membrane (25) into two chambers (23, 24), one of which said chambers (24) is maintained at a reference pressure and the other (23) at a pressure which depends on the gas pressure in the outlet pipe (3), (ii) an opening, closed by a membrane (43) integral with a cap (42), located between the said chamber (24) at the reference pressure and the said gas outlet pipe (3), (iii) a gas inlet chamber (10) with an opening (11) which leads to the said outlet pipe (3) in correspondence with the said cap (42), the movements of which said cap open and close the passage (11) between the said inlet chamber (10) and the said outlet pipe (3), and (iv) means (41) integral with the said first membrane (25) which act on the said cap (42) so that it approaches and retracts from opening (11) of the said gas inlet chamber, the reducer including (v) an additional regulation stage constituted by a chamber divided by a membrane (14) into two chambers (15, 16), one of which said chambers (16) is maintained at the reference pressure while the second such chamber (15) is maintained at the reduced gas inlet pressure into chamber (10), (vi) regulation means (19) designed to act on the said membrane (14) to regulate the said reduced inlet pressure in the said gas inlet chamber (10), (vii) a valve (5) designed to close a high-pressure gas inlet pipe (2, 4), which said valve (5) is integral with the said membrane (14), and (viii) means (12, 13) which place the said chamber (15) in communication with the area close to the outlet opening (11) of the said gas entry chamber (10).

2. Pressure reducer for compressed gases as claimed in claim 1, characterised in that the said valve (5) is constituted by a cylindrical body which slides inside a seating to which the said compressed gas feed pipe (4) leads, which said valve moves between a position in which it closes the said pipe (4) and a position in which it opens the said pipe (4), and presents a plurality of passages (7) which place the upper and lower areas of the said chamber (10) in communication with one another.

3. Pressure reducer for compressed gases as claimed in claim 1, characterised in that the said means which place the said chamber (15) in communication with the area at the outlet opening of the said gas inlet chamber (10) consist of a stem (12) integral with the said valve (5) that closes pressurised gas inlet opening (4), which said stem (12) is constrained to the said membrane (14) of the said first stage and extends almost to the said cap (42) which opens and closes the outlet (11) from the gas inlet chamber (10), and which said stem (12) presents an axial hole (13) which places the said chamber (15) in communication with the area close to the said cap (42).

4. Pressure reducer for compressed gases as claimed in claim 1, characterised in that it includes a gasket fitted to the edge of the said outlet opening (11) from gas inlet chamber (10), and that the said cap (42) designed to close the said opening (11) rests on the said gasket.

5. Pressure reducer for compressed gases as claimed in claim 1, characterized in that said cap (42) moves axially in relation to the said stem (12).

6. Pressure reducer for compressed gases as claimed in claim 1, characterized in that it comprises means designed to detect pressure variations in the outlet pipe (3) resulting from demand for gas and the consequent variation in pressure inside one of the chambers (23) of the second regulation stage, so that the said membrane (25) bends following the said pressure variation, thus moving the said cap (42).

7. Pressure reducer for compressed gases as claimed in claim 5, characterised in that it comprises:
   a chamber (30) which communicates with the said chamber (23) of the said regulation stage
   a second chamber (33) which communicates with the said chamber (30) by means of a Venturi tube (32)

a chamber divided by a flexible membrane (37) into a chamber (36) maintained at the reference pressure and a chamber (35); the said chamber (35) communicates with the said chamber (33) by means of openings (34), with the said chamber (30) by means of openings (39), and with the outlet pipe by means of openings (38)

an ejector (31) which directs the gas flowing from chamber (19) to the said Venturi tube (32)

the pressure reduction in the outlet pipe (3) resulting from demand for gas causing the said membrane (37) to close the said communication openings (39) between the said chamber (35) and the said chamber (30) in such a way as to prevent recirculation of gas through the said Venturi tube (32) and to cause a pressure reduction in the said chamber (30) which is transmitted to the said chamber (23) defined by the said membrane (25), so that the said membrane (25) moves, distancing the said cap (42) from the said opening (11) of the gas inlet chamber to allow a greater flow of gas to the outlet pipe (3).

8. Pressure reducer for compressed gases as claimed in claim 1, characterized in that it comprises means (40) designed to close the pipe (44) which connects the said chamber (33) to the outlet pipe (3) to regulate the sensitivity of the device.

9. Pressure reducer for compressed gases characterised in that it comprises:

a regulation stage constituted by a chamber divided by a first membrane (25) into two chambers (23, 24), one of which said chambers (24) is maintained at a reference pressure and the other (23) at a pressure which depends on the gas pressure in the outlet pipe (3)

an opening, closed by a membrane (43) integral with a cap (42), located between the said chamber (24) at the reference pressure and the said gas outlet pipe (3)

a gas inlet chamber (10) with an opening (11) which leads to the said outlet pipe (3) in correspondence with the said cap (42), the movements of which said cap open and close the passage (11) between the said inlet chamber (10) and the said outlet pipe (3)

means (41) integral with the said first membrane (25) which act on the said cap (42) so that it approaches and retracts from opening (11) of the said gas inlet chamber an additional regulation stage constituted by a chamber divided by a membrane (14) into two chambers (15, 16), one of which said chambers (16) is maintained at the reference pressure while the second such chamber (15) is maintained at the reduced gas inlet pressure into chamber (10)

regulation means (19) designed to act on the said membrane (14) to regulate the said reduced inlet pressure in the said gas inlet chamber (10)

a valve (5) designed to close a high-pressure gas inlet pipe (2, 4)

a stem (12), integral with the said valve (5), which is constrained to the said membrane (14) of the said first stage and extends almost to the said cap (42) which opens and closes the outlet (11) from the gas inlet chamber (10), which said stem (12) presents an axial hole (13) which places the said chamber (15) in communication with the area close to the said cap (42).

a chamber (30) which communicates with the said chamber (23) of the said regulation stage a chamber (33) which communicates with the said chamber (30) by means of a Venturi tube (32)

a chamber divided by a flexible membrane (37) into a chamber (36) maintained at the reference pressure and a chamber (35), which said chamber (35) communicates with the said chamber (33) by means of openings (34), with the said chamber (30) by means of openings (39), and with the outlet pipe by means of openings (38)

an ejector (31) which directs the gas flowing from chamber (19) to the said Venturi tube (32).

10. Pressure reducer for compressed gases as claimed in claim 9, characterized in that the said stem (12) designed to place the said chamber (15) of the said second regulation stage in communication with the said gas outlet pipe (3) moves, so that it remains at a basically constant distance from the said cap (42).

* * * * *